US012344820B2

(12) United States Patent
Schneider et al.

(10) Patent No.: US 12,344,820 B2
(45) Date of Patent: Jul. 1, 2025

(54) LAUNDRY DETERGENT AND FABRIC CARE COMPOSITIONS WITH SULFONAMIDES FOR ODOR REMOVAL FROM FABRICS

(71) Applicant: Rem Brands, Inc., Walton, KY (US)

(72) Inventors: David Schneider, Union, KY (US); Jonathan Schneider, Walton, KY (US)

(73) Assignee: REM BRANDS, INC., Walton, KY (US)

( * ) Notice: Subject to any disclaimer, the term of this patent is extended or adjusted under 35 U.S.C. 154(b) by 3 days.

(21) Appl. No.: 17/136,987

(22) Filed: Dec. 29, 2020

(65) Prior Publication Data

US 2021/0198596 A1 Jul. 1, 2021

Related U.S. Application Data

(60) Provisional application No. 62/954,975, filed on Dec. 30, 2019.

(51) Int. Cl.

*C11D 3/32* (2006.01)
*C11D 1/83* (2006.01)
*C11D 3/00* (2006.01)
*C11D 3/386* (2006.01)
*C11D 3/48* (2006.01)
*C11D 17/04* (2006.01)

(52) U.S. Cl.

CPC .................. *C11D 3/32* (2013.01); *C11D 1/83* (2013.01); *C11D 3/001* (2013.01); *C11D 3/386* (2013.01); *C11D 3/48* (2013.01); *C11D 17/047* (2013.01)

(58) Field of Classification Search

CPC ......... C11D 7/34; C11D 3/349; C11D 3/0068; C11D 3/48; C11D 1/12; C11D 1/29; C11D 1/37; C11D 3/10; C11D 3/0036; C11D 3/32; C11D 3/386; C11D 7/3263; C11D 9/12; C11D 17/047; C11D 2111/12; A61K 2300/00

See application file for complete search history.

(56) References Cited

U.S. PATENT DOCUMENTS 4,814,095 A 3/1989 Puchta et al.
7,560,592 B2 * 7/2009 Schneider .............. A01N 41/08 564/99
7,629,492 B2 * 12/2009 Schneider ............. C07C 311/48 564/99
8,003,823 B2 * 8/2011 Schneider .............. A01N 41/06 564/99
8,759,399 B2 * 6/2014 Schneider .............. A01N 41/06 564/84
9,040,587 B2 * 5/2015 Schneider .............. A01N 59/00 564/84
9,408,940 B2 * 8/2016 Schneider ............... A61L 15/46
10,653,811 B2 * 5/2020 Schneider .............. A61Q 19/00
2004/0102348 A1 * 5/2004 Schneider ................ C11D 7/34 510/283
2004/0266653 A1 * 12/2004 Delplancke ........ C11D 3/38663 510/470
2005/0287109 A1 * 12/2005 Schneider .............. A61K 31/74 424/78.1
2006/0073995 A1 * 4/2006 Schneider ................ A61K 8/46 510/119
2006/0276672 A1 * 12/2006 Schneider ................ C11D 7/34 562/430
2006/0280766 A1 * 12/2006 Schneider .............. A01N 41/08 424/405
2007/0071537 A1 * 3/2007 Reddy ................. A61M 35/003 401/196
2009/0227485 A1 * 9/2009 Schneider ................ C11D 7/34 510/281
2012/0003173 A1 * 1/2012 Schenider ............... A61L 15/46 502/402

(Continued)

FOREIGN PATENT DOCUMENTS

GB 804450 A 11/1958
GB 2354771 * 4/2001
WO WO 2016/130588 A1 8/2016

OTHER PUBLICATIONS

International Search Report from PCT/US2020/067350 dated Apr. 15, 2021.

*Primary Examiner* — Charles I Boyer
(74) *Attorney, Agent, or Firm* — Lippes Mathias LLP

(57) ABSTRACT

Laundry detergent compositions, fabric dryer sheets, and other fabric care compositions include a halo active aromatic sulfonamide compound of Formula (I):

Formula (I)

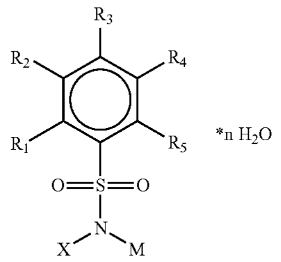

wherein the variables $R_1$, $R_2$, $R_3$, $R_4$, $R_5$, X, M and n are as defined herein. The compositions can be used to reduce microbes and deodorize materials and fabrics, such as clothing, with extended performance over long time periods.

16 Claims, No Drawings

(56) References Cited

U.S. PATENT DOCUMENTS

| | | | | |
|---|---|---|---|---|
| 2015/0147286 | A1* | 5/2015 | Barrera | C11D 3/162<br>424/70.122 |
| 2016/0158404 | A1* | 6/2016 | Schneider | B01J 20/22<br>502/402 |
| 2016/0319226 | A1* | 11/2016 | Lant | C11D 3/38636 |
| 2017/0283750 | A1* | 10/2017 | Denny | C11D 17/047 |
| 2017/0340998 | A1* | 11/2017 | Schneider | B01J 20/3253 |
| 2020/0230046 | A1* | 7/2020 | Reynaud | A61Q 5/06 |
| 2022/0033531 | A1* | 2/2022 | Adelman | C08L 5/00 |

* cited by examiner

LAUNDRY DETERGENT AND FABRIC CARE COMPOSITIONS WITH SULFONAMIDES FOR ODOR REMOVAL FROM FABRICS

CROSS-REFERENCE TO RELATED APPLICATIONS

This application claims priority to U.S. Provisional Patent Application Ser. No. 62/954,975, filed on Dec. 30, 2019, which is incorporated by reference in its entirety.

BACKGROUND

The present disclosure relates to laundry detergent and fabric care compositions with improved odor controlling and antimicrobial properties. In particular, the present disclosure relates to laundry detergent and other fabric care compositions comprising halo active sulfonamide compounds. These compositions find particular application in residential (i.e., domestic) and commercial washing applications. Fabric softeners, stain removers, fabric dryer sheets, etc. comprising such sulfonamide compounds are also described herein.

During the laundry process in a residential or commercial washing machine, dirt, stains, and other undesirable compounds are removed from the soiled fabrics by a combination of the physical action (agitation) of the machine and the detergency of the laundry detergent composition. When laundering fabrics, consumers expect excellent soil removal (i.e., cleaning). After being washed, the fabrics are dried. While numerous detergent products are available, there is a continuous need for improved performance.

Along these lines, two particularly important areas of fabric care benefits include odor elimination and antimicrobial benefits. Various bodily fluids and undesirable compounds such as sweat, urine, feces, etc., may have an unpleasant odor (malodor) due to odor-causing molecules, which may be aliphatic, aromatic, or heterocyclic compounds containing oxygen, sulfur, or nitrogen. These odor-causing molecules can be masked using a more pleasant smelling molecule, such as a perfume. However, it would be desirable to alter, neutralize, and/or destroy the odor-causing molecules instead. It would also be beneficial to provide improved microbial killing performance and prophylactic protection.

Thus, it would be desirable to provide detergent and fabric care compositions that can alter, neutralize, and/or destroy odor-causing molecules in soiled fabrics and that have extended microbial killing performance.

BRIEF DESCRIPTION

It has been found that certain laundry detergent and fabric care compositions containing halo active aromatic sulfonamide compounds can provide odor-controlling and/or extended microorganism killing performance on various fabric surfaces to which they are applied. In certain circumstances, such odor-controlling and/or residual kill performance can extend for up to one or more days, including from about 1 day to about 30 days after usage. Articles treated with these compounds can be stored on the shelf for even longer periods of time and maintain their performance. In addition, the laundry detergent compositions containing the halo active aromatic sulfonamides are not toxic and are non-irritating to the skin.

Disclosed herein, in various embodiments, are odor-controlling and anti-microbial fabric care compositions that include a halo active aromatic sulfonamide compound according to Formula (I):

Formula (I)

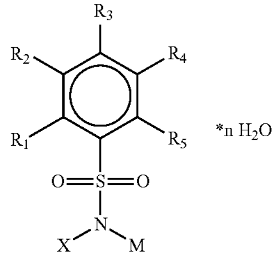

wherein $R_1$, $R_2$, $R_3$, $R_4$, and $R_5$ are independently selected from hydrogen, COOR', CON(R")$_2$, alkoxy, CN, $NO_2$, $SO_3R$", halogen, substituted or unsubstituted phenyl, sulfonamide, halosulfonamide, N(R")$_2$, substituted or unsubstituted $C_1$-$C_{18}$ alkyl, and substituted or unsubstituted aromatic;

R' is hydrogen, an alkali metal, an alkaline earth metal, substituted $C_1$-$C_{18}$ alkyl, or unsubstituted $C_1$-$C_{18}$ alkyl; and R" is hydrogen or substituted or unsubstituted $C_1$-$C_{18}$ alkyl, where the two R" groups in CON(R")$_2$ and N(R")$_2$ may be independently selected;

X is halogen;

M is an alkali or alkaline earth metal; and n is the number of water molecules per molecule of the sulfonamide compound.

The compositions include an effective amount of the sulfonamide compound, such as from about 0.0001 wt % to about 99.9 wt % of the total composition.

These and other non-limiting features or characteristics of the present disclosure will be further described below.

DETAILED DESCRIPTION

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Definitions

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint, and the endpoints of different ranges are independently combinable as well. For example, the range of "from 2 to 10" is inclusive of the endpoints, 2 and 10, and all the intermediate values. As another example, the ranges "1 to 10" and "4 to 8" also discloses the ranges "1 to 8" and "4 to 10".

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The term "ambient temperature" refers to a temperature of 20° C. to 25° C.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "alkyl" refers to a radical composed entirely of carbon atoms and hydrogen atoms which is fully saturated. The alkyl radical may be linear, branched, or cyclic, and such radicals may be referred to as linear alkyl, branched alkyl, or cycloalkyl.

The term "aromatic" refers to a radical that has a ring system containing a delocalized conjugated pi system with a number of pi-electrons that obeys Hückel's Rule. The ring system may include heteroatoms (e.g. N, S, Se, Si, O), or may be composed exclusively of carbon and hydrogen. Exemplary aromatic groups include phenyl, thienyl, naphthyl, and biphenyl.

The term "aryl" refers to an aromatic radical composed exclusively of carbon and hydrogen. Exemplary aryl groups include phenyl, naphthyl, and biphenyl.

The term "heteroaryl" refers to an aromatic radical containing at least one heteroatom. Exemplary heteroaryl groups include thienyl. Note that "heteroaryl" is a subset of "aromatic", and is exclusive of "aryl".

The term "alkoxy" refers to an alkyl radical which is attached to an oxygen atom, i.e. $—O—C_nH_{2n+1}$, to a molecule containing such a radical.

The term "halogen" refers to fluorine, chlorine, bromine, and iodine.

The term "substituted" refers to at least one hydrogen atom on the named radical being substituted with another functional group, such as halogen, —CN, or $—NO_2$. Besides the aforementioned functional groups, an aromatic group may also be substituted with alkyl or alkoxy. An exemplary substituted aryl group is methylphenyl.

The term "alkali metal" refers to lithium, sodium, and potassium.

The term "alkaline earth metal" refers to magnesium and calcium.

The terms "article" and "device" are used to refer to an item or object, and should not be construed as limiting such items due to size. It is specifically contemplated that smaller items can be assembled to form a larger item, and both the small and large items will be referred to herein as "articles" and/or "devices".

In all embodiments of the present disclosure, all percentages are weight percentages by weight of the total composition, unless specifically stated otherwise. All ratios are weight ratios, unless specifically stated otherwise.

Detergent Compositions and Other Liquid Compositions

The deodorizing detergent compositions of the present disclosure comprise (A) a halo active aromatic sulfonamide compound, as described further herein. The detergent compositions can also include one or more of (B) a liquid carrier; (C) at least one surfactant; (D) at least one enzyme; (E) detergency builder; (F) anti-redeposition agent; (G) deposition aids; (H) other detergent ingredients. The compositions disclosed herein may also include any combination of two or more of these components. Such compositions can be provided in the form of laundry detergents, fabric softeners, stain removers, etc., depending on the other ingredients/components present in the composition.

These liquid compositions include laundry compositions, fabric softening compositions, stain removers, etc. The deodorizing compositions disclosed herein may be in the form of powders, tablets, liquids, gels, water-soluble pouches, and any combination thereof. In certain embodiments, the detergent compositions include one or more phases, such as a first phase containing one or more components described herein and a second phase containing one or more other components described herein. In further embodiments, one or more of the components described herein may be encapsulated, to separate incompatible components from each other.

Halo Active Aromatic Sulfonamide Compounds (A)

Halo active aromatic sulfonamide organic compounds are useful for reducing or eliminating odor. Chloramine-T is an example of a sulfonamide organic compound that has the ability to release an active chloride ion when needed on demand, immediately after which it simultaneously generates an active aromatic sulfo nitrene companion ion. The chlorine atom has a +1 formal charge in a hypochlorite ion, $ClO^-$, which is the form taken by the chlorine atom when dissociated from the sulfonamide compound. Reference to the chlorine atom as having a +1 or $1^-$ charge may be used in this application interchangeably because this terminology has no effect on the compound itself or its use.

It has been found in the present disclosure that halo active aromatic sulfonamide organic compounds also have an antimicrobial performance that can extend over long periods of time. This may be useful in laundry detergent compositions. It has been found that hydrates of halo active aromatic sulfonamide organic compounds will continue to exhibit disinfectant ability over long time periods, such as over 24 hours, over 48 hours, over 72 hours, or over 168 hours.

The halo active aromatic sulfonamide organic compounds also have several usage benefits over traditional disinfectants such as bleach or hydrogen peroxide. Bleach is usually contraindicated for use with colored fabrics; has a very strong chlorine odor in open air; only reduces microbes when wet, and has no residual antimicrobial action once dry; has poor stability in "non-ambient" temperatures and light exposure; and is toxic, a skin and eye irritant, and a skin sensitizer. In contrast, compositions using halo active aromatic sulfonamide organic compounds can have equivalent antimicrobial performance, but also have long term residual antimicrobial action after drying; offer residual odor elimination when dry; have excellent stability, with a shelf life measured in years; and have extremely low toxicity, are not skin/eye irritating, and are not a sensitizer.

The halo active aromatic sulfonamide compound used in the detergent compositions of the present disclosure has the structure of base Formula (I):

Formula (I)

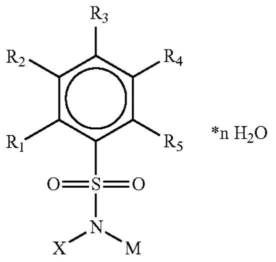

wherein $R_1$, $R_2$, $R_3$, $R_4$, and $R_5$ are independently selected from hydrogen, COOR', CON(R")$_2$, alkoxy, CN, $NO_2$, $SO_3R$", halogen, substituted or unsubstituted phenyl, sulfonamide, halosulfonamide, N(R")$_2$, substituted or unsubstituted $C_1$-$C_{18}$ alkyl, and substituted or unsubstituted aromatic;

R' is hydrogen, an alkali metal, an alkaline earth metal, substituted $C_1$-$C_{18}$ alkyl, or unsubstituted $C_1$-$C_{18}$ alkyl; and R" is hydrogen or substituted or unsubstituted $C_1$-$C_{18}$ alkyl, where the two R" groups in CON(R")$_2$ and N(R")$_2$ may be independently selected;

X is halogen;

M is an alkali or alkaline earth metal; and n is the number of water molecules per molecule of the sulfonamide compound.

The term "aromatic", as used herein, does not refer to a smell detected by the nose.

Generally, M is sodium or potassium. X is generally chlorine, bromine, fluorine, or iodine, and in particular embodiments is chlorine. Compounds of Formula (I) may or may not be hydrated, as indicated by the variable n. In particular embodiments, the compounds of Formula (I) are a trihydrate (i.e., n=3) or a hexahydrate (i.e. n=6). In other embodiments, the compound is in a solid form, such as a powder.

When the phenyl and/or alkyl group is substituted, one or more hydrogen atoms may be independently replaced with hydroxyl or halogen.

In particular embodiments of Formula (I), $R_3$ is methyl, COOH, or $COOM_1$; $R_1$, $R_2$, $R_4$, and $R_5$ are independently selected from hydrogen, COOH, $COOM_1$, COOR', CON (R")$_2$, alkoxy, CN, $NO_2$, $SO_3R$", halogen, substituted or unsubstituted phenyl, sulfonamide, halosulfonamide, N(R")$_2$, substituted or unsubstituted $C_1$-$C_{18}$ alkyl, and substituted or unsubstituted aromatic; X is halogen; $M_1$ is an alkali or alkaline earth metal; and n is the number of water molecules per molecule of the sulfonamide compound.

In further embodiments, $R_3$ is methyl, COOH, or $COOM_1$; $R_1$, $R_2$, $R_4$, and $R_5$ are independently selected from hydrogen, COOH, $COOM_1$, COOR', CON(R")$_2$, alkoxy, CN, $NO_2$, $SO_3R$", halogen, substituted or unsubstituted phenyl, sulfonamide, halosulfonamide, N(R")$_2$, substituted or unsubstituted $C_1$-$C_{18}$ alkyl, and substituted or unsubstituted aromatic; X is halogen; M is an alkali or alkaline earth metal; n is the number of water molecules per molecule of the sulfonamide compound; and at least one of $R_1$, $R_2$, $R_4$, and $R_5$ is not hydrogen.

In yet other embodiments of Formula (I), $R_3$ is selected from COOH, $COOM_1$, COOR', CON(R")$_2$, CN, $NO_2$, halogen, and substituted or unsubstituted $C_2$-$C_{18}$ alkyl; $R_1$, $R_2$, $R_4$, and $R_5$ are independently selected from hydrogen, COOH, $COOM_1$, COOR', CON(R")$_2$, alkoxy, CN, $NO_2$, $SO_3R$", halogen, substituted or unsubstituted phenyl, sulfonamide, halosulfonamide, N(R")$_2$, substituted or unsubstituted $C_1$-$C_{18}$ alkyl, and substituted or unsubstituted aromatic; X is halogen; M is an alkali or alkaline earth metal; and n is the number of water molecules per molecule of the sulfonamide compound.

In still other embodiments of Formula (I), $R_1$, $R_2$, $R_3$, $R_4$, and $R_5$ are independently selected from hydrogen, COOH, $COOM_1$, $NO_2$, halogen, N(R")$_2$, substituted or unsubstituted $C_1$-$C_{18}$ alkyl, and substituted or unsubstituted aromatic; X is halogen; M is an alkali or alkaline earth metal; and n is the number of water molecules per molecule of the sulfonamide compound.

In yet other embodiments of Formula (I), $R_2$ and $R_4$ are identical to each other; and $R_1$, $R_3$, and $R_5$ are hydrogen.

In yet other embodiments of Formula (I), $R_2$ and $R_4$ are hydrogen; and $R_1$, $R_3$, and $R_5$ are identical to each other.

In more specific embodiments of Formula (I), $R_3$ is selected from COOH, $COOM_1$, COOR', and CON(R")$_2$. Most desirably, $R_3$ is COOH or $COOM_1$, while $R_1$, $R_2$, $R_4$, and $R_5$ are hydrogen.

In other embodiments of Formula (I), $R_1$, $R_2$, $R_3$, $R_4$, and $R_5$ are independently selected from hydrogen, COOH, $COOM_1$, COOR', CON(R")$_2$, $NO_2$, halogen, N(R")$_2$, substituted or unsubstituted $C_1$-$C_{18}$ alkyl, and substituted or unsubstituted aromatic; wherein at least one of $R_1$, $R_2$, $R_3$, $R_4$, and $R_5$ is not hydrogen; X is halogen; M is an alkali or alkaline earth metal; and n is the number of water molecules per molecule of the sulfonamide compound.

In still other embodiments of Formula (I), $R_3$ is COOH or $COOM_1$; $R_1$, $R_2$, $R_4$, and $R_5$ are independently selected from hydrogen, $NO_2$, halogen, N(R")$_2$, substituted or unsubstituted $C_1$-$C_{18}$ alkyl, and substituted or unsubstituted aromatic; X is halogen; M is an alkali or alkaline earth metal; and n is the number of water molecules per molecule of the sulfonamide compound. In further specific embodiments, at least one of $R_1$, $R_2$, $R_4$, and $R_5$ is not hydrogen.

In some embodiments of Formula (I), at least one of $R_1$, $R_2$, $R_3$, $R_4$, or $R_5$ are not hydrogen. In more specific embodiments of Formula (I), at least two of $R_1$, $R_2$, $R_3$, $R_4$, or $R_5$ are not hydrogen. In other words, the benzene ring contains the sulfonamide substituent and an additional one or two other substituents.

In other embodiments of Formula (I), the halo active aromatic sulfonamide compound has the structure of Formula (II):

Formula (II)

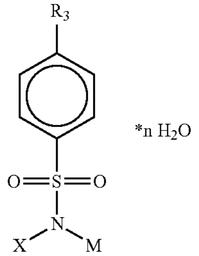

wherein $R^3$ is COOR'; R' is hydrogen, an alkali metal, an alkaline earth metal, substituted $C_1$-$C_{18}$ alkyl, unsubstituted $C_1$-$C_{18}$ alkyl, substituted aromatic, or unsubstituted aromatic; X is halogen; M is an alkali or alkaline earth metal; and n is the number of water molecules per molecule of the sulfonamide compound. The N-chloro-4-carboxybenzene-sulfonamide compound of Formula (II) is also referred to herein as BENZ. BENZ exhibits a lower chlorine smell than chloramine-T or chloramine-B. When BENZ is combined with at least one fragrance, there is no detectable chlorine smell for most humans. BENZ is also known as Monalazone Disodium, CAS #61477-95-0.

Two particular sulfonamide compounds contemplated for use are N-chloro-p-toluenesulfonamide (i.e. chloramine-T) and N-chloro-4-carboxybenzenesulfonamide (i.e. BENZ). These two compounds are shown below as Formulas (III) and (IV):

Formula (III)

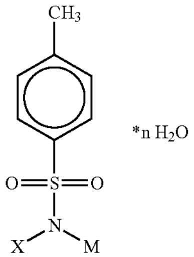

Formula (IV)

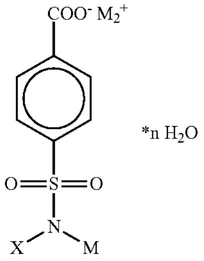

wherein $M_2$ is hydrogen, an alkali metal, or an alkali earth metal; X is halogen, M is independently an alkali or alkaline earth metal; and n is the number of water molecules per molecule of each sulfonamide compound. Desirably, $M_2$ is hydrogen, sodium, or potassium.

In other particular embodiments, one or more of $R_1$, $R_2$, $R_3$, $R_4$, and $R_5$ are substituted with —COOR' (and the others are hydrogen). In this regard, it is believed that when the halo active aromatic sulfonamide compound has two or more ionic charges, that the compound has higher antimicrobial performance.

The halo active aromatic sulfonamide compounds of base Formula (I) are stable and do not decompose in aqueous solution, allowing the detergent composition to have a long shelf life. The compounds of Formula (I) are also very soluble in water, low in toxicity, and have minimal bleach odor.

The halo active aromatic sulfonamide compound (A) is generally present in the detergent composition in the amount of about 0.0001 wt % to about 99.9 wt %. In particular embodiments, the sulfonamide compound may be present in the detergent composition in the amount of about 0.001 to about 2 wt %, or from about 0.01 to about 1 wt %, or from about 0.5 to about 5 wt %, or from about 2 to about 5 wt %, or from about 2 wt % to about 20 wt %, or from about 8 wt % to about 25 wt %. It is noted that these amounts are for the sulfonamide compound in the detergent composition. The resulting amount of the sulfonamide compound during washing will be much lower, due to the addition of water during the wash cycle, particularly in a washing machine where 10 to 20 gallons of water are usually added.

Liquid Carrier (B)

In particular embodiments, the detergent compositions are liquids or gels. Thus, the detergent compositions of the present disclosure may optionally comprise one or more liquid carriers. The liquid carrier can be aqueous or non-aqueous; and can include water alone, or organic solvents alone, and/or mixtures thereof. In particular embodiments, water generally makes up at least a portion of the deodorizing detergent composition. In some embodiments, the composition comprises from about 0.0001 wt % to about 99 wt %, or from about 1 wt % to about 75 wt %, or from about 10 wt % to about 75 wt %, or from about 10 wt % to about 50 wt %, or at least 15 wt % of water in addition to another liquid carrier.

Alternatively, organic solvents may be used as the liquid carrier. Examples of such organic solvents can include alcohols, glycerol, glycols, polyalkylene glycols such as polyethylene glycol, and mixtures thereof. Examples of alcohols include ethanol, propanol, isopropanol, and 1,2-propanediol. The liquid carrier is typically present at levels in the range of from 1% to 95%, preferably at least from 5% to 70%, more preferably from 10% to 50%, and most preferably from 15% to 30% by weight of the composition.

For stability and for optimum performance, the pH of the detergent compositions may be between about 6 and about 14, though generally the pH should be kept between about 7 and about 10, or between about 7.5 and about 9.

Surfactants (C)

The detergent composition usually includes at least one surfactant. The surfactant(s) may be present in the detergent composition in an amount from about 0.1 wt % to about 70 wt %, or from about 10 wt % to about 50 wt %, or from about 15 wt % to about 35 wt %, or from about 15 wt % to about 30 wt %.

The surfactant(s) may be selected from anionic, nonionic, amphoteric, cationic, and zwitterionic surfactants, and combinations thereof.

Anionic surfactants are well-known to those skilled in the art. Examples include anionic sulfonate or sulfonic acid surfactants, alkylbenzene sulfonates, primary and secondary alkylsulfates, alkyl ether sulfates, and fatty acid ester sulfonates. These surfactants typically have from 9 to 22 carbon atoms. The sulfates can be linear or branched. Other suitable anionic surfactants can include fatty methyl ester sulfonates, alkyl ethyoxy sulfates (AES), and/or alkyl polyalkoxylated carboxylates (AEC). Mixtures are also contemplated. The anionic surfactants are typically present in the form of their salts.

Nonionic surfactants are also contemplated for use. Examples include alkoxylated nonionic surfactants typically having from 6 to 22 carbon atoms. Such surfactants can be linear, branched, cyclic, or aromatic. Sometimes, the nonionic surfactant is derived from a primary or secondary alcohol. The nonionic surfactants can be "capped," wherein one or more —OH groups are replaced by —OR wherein R is typically $C_1$-$C_3$ alkyl.

Cationic surfactants can also be used. Examples include cationic esters and quaternary ammonium salts of the general formula $R_1R_2R_3R_4N^+X^-$ wherein the R groups are long or short hydrocarbyl chains, typically alkyl, hydroxyalkyl or ethoxylated alkyl groups, and X is a solubilizing group such as alkyl. Other examples of cationic surfactants include alkyltrimethylammonium salts or their hydroxyalkyl substituted analogs. The cationic surfactants can be either water-soluble or water-insoluble.

Amphoteric surfactants can also be used in the detergent compositions. Examples include derivatives of aliphatic secondary and tertiary amines such as cocoamphoacetate, cocoamphodiacetate, lauroamphoacetate, lauroamphodiacetate, and mixtures thereof.

Zwitterionic surfactants that could also be used include derivatives of aliphatic quaternary ammonium, phosphonium, and sulfonium compounds, for example betaines. Amine oxide surfactants may also be used.

In particular embodiments, the surfactant(s) are anionic and/or nonionic surfactants.

Enzymes (D)

The detergent compositions disclosed herein may also include one or more enzymes and an enzyme stabilization system. Typical amounts of the enzyme are from about 0.0001 wt % to about 10 wt % of the composition. Examples of enzymes suitable for incorporation into the laundry detergent compositions of the present disclosure include peroxidases, proteases, gluco-amylases, amylases, xylanases, cellulases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, dextranase, transferase, laccase, mannanase, xyloglucanases, derivatives thereof and mixtures thereof. Typically, such enzymes attack one or more types of stains that are desirably removed from fabrics or clothing. These enzymes can have any suitable origin (for example vegetable, animal, bacterial, or fungal).

Examples of an enzyme stabilization system include boron-based enzyme stabilization systems. The enzyme stabilization system can contain one or more than one component. Typically, the enzyme stabilization system of the present disclosure contains boric acid or salts thereof, preferably capable of forming boric acid in the composition.

Detergency Builder (E)

The detergent composition can include at least one detergency builder. The builder(s) may be present in the detergent composition in an amount from about 0.1 wt % to about 70 wt %, or from about 10 wt % to about 50 wt %, or from about 15 wt % to about 35 wt %, or from about 15 wt % to about 30 wt %.

Examples of inorganic detergency builders include phosphates, amorphous aluminosilicates, layered silicates alkali metal aluminosilicates, and especially crystalline alkali metal aluminosilicates (zeolites), preferably in sodium salt form. Zeolites can be present in a total amount of from 5 to 60 wt %, preferably from 10 to 50 wt %.

Examples of organic detergency builders include polycarboxylate polymers; monomeric polycarboxylates; citrates; gluconates; succinates; and sulphonated fatty acid salts.

Anti-Redeposition Agent (F)

In addition to the other components discussed herein, the detergent compositions may include an anti-redeposition agent. Anti-redeposition agents are useful for several purposes, but primarily to prevent insolubles removed from a material (e.g., fabric) from redepositing on the cloth before and after the fabric is removed from the rinse solution. Examples include sodium carboxy methyl cellulose (SCMC) and certain polysaccharide polymers. The anti-redeposition agent may comprise from about 0.01 wt % to about 50 wt % of the detergent composition, or from about 1 wt % to about 20 wt %, or from about 5 wt % to about 10 wt %.

Deposition Aids (G)

In particular embodiments, the detergent composition includes at least one deposition aid. In such embodiments, the deposition aid(s) may facilitate the deposition of at least the halo active sulfonamide compound onto the material to be cleaned (e.g., clothing), thereby enhancing the long-term antimicrobial properties of the detergent composition. The deposition aid(s) may be present in the detergent composition in an amount from about 0.1 wt % to about 70 wt %, or from about 10 wt % to about 50 wt %, or from about 15 wt % to about 35 wt %, or from about 15 wt % to about 30 wt %.

The deposition aid is usually cationic. Examples include cationically derivatized polysaccharides containing cis-hydroxy groups, wherein on average at least one hydrogen atom per pair of cis-hydroxy groups is at least partly or completely substituted with a cationic substituent or with a nonionic substituent. The degree of substitution of the cationically substituted hydrogen atom(s) of the cis-hydroxy group(s) in the deposition aid is on average from 0.01 to 1.0, preferably from 0.05 to 0.4, and more preferably from 0.1 to 0.2. The degree of molar substitution of the nonionically substituted hydrogen atom(s) of the cis-hydroxy group(s) in the deposition aid is on average from 0.1 to 5.0, preferably from 0.15 to 2.5, and more preferably from 0.2 to 2.0. Other examples include hydroxyalkyl guar hydroxyalkyl trimonium salts.

Other Detergent Ingredients (H)

The detergent composition can also include one or more additional ingredients, including one or more of: bleach and/or bleach system; sodium carbonate; sodium silicate; sodium sulphase; foam controllers; foam boosters; perfumes; fabric conditioners; soil release polymers; dye transfer inhibitors; photobleaches; fluorescers; pearlizers; and colorants. The additional ingredients may be present in the detergent composition in a total amount from about 0.01 wt % to about 70 wt %, or from about 10 wt % to about 50 wt %, or from about 15 wt % to about 35 wt %, or from about 15 wt % to about 30 wt %.

In embodiments containing bleach and/or a bleach system, this component can include a peroxy bleach compound, for example, an inorganic persalt or an organic peroxyacid, capable of yielding hydrogen peroxide in aqueous solution. Examples include sodium perborate monohydrate and tetrahydrate, and sodium percarbonate, the latter being especially preferred. The peroxy bleach compound can be present in an amount of from about 5 wt % to about 35 wt %, preferably from about 10 wt % to about 25 wt %.

The peroxy bleach compound may be used in conjunction with a bleach activator (bleach precursor) to improve bleaching action at low wash temperatures. The bleach precursor is suitably present in an amount of from about 1 wt % to about 8 wt %, preferably from about 2 wt % to about 5 wt %. Examples include peroxycarboxylic acid precursors, peracetic acid precursors, and peroxybenzoic acid precursors.

A bleach stabilizer (heavy metal sequestrant) may also be present. Suitable bleach stabilizers include ethylenediamine tetraacetate (EDTA), diethylenetriamine pentaacetate (DTPA), ethylenediamine disuccinate (EDDS), and polyphosphonates.

Examples of foam controllers include highly crystalline waxes, hydrogenated fatty acids, silicones, silicone/silica mixtures, and combinations thereof. The foam controller is usually present in amounts of less than 10 wt %, such as about 0.001 wt % to about 10 wt %, or from about 0.05 wt % to about 5 wt %, of the total detergent composition.

Other Fabric Care Products

Liquid fabric softeners will typically contain the sulfonamide compound (A), a liquid carrier (B), and a fabric softener. Examples of cationic softening agents or antistatic agents include alkylated quaternary ammonium compounds, ring or cyclic quaternary ammonium compounds, aromatic quaternary ammonium compounds, diquaternary ammonium compounds, alkylated quaternary ammonium compounds, amidoamine quaternary ammonium compounds, ester quaternary ammonium compounds, and mixtures thereof.

The present disclosure also relates to fabric dryer sheets which comprise (A) a halo active aromatic sulfonamide compound, as previously described. Dryer sheets are commonly used to impart anti-static properties, fabric softening properties, and fragrance to the laundry during a drying cycle. Dryer sheets are generally cationic in nature to help neutralize the residual negative anionic charge that arises in fabrics/clothes during the washing process, i.e. to reduce static cling.

A fabric dryer sheet generally comprises the sulfonamide compound and a nonwoven substrate upon which the sulfonamide compound is deposited.

The nonwoven substrate can be made from natural fibers or synthetic fibers. Examples of natural fibers include cellulose, polylactic acid material, wood fibers, cotton, wool, etc. Examples of synthetic fibers include polyester, nylon, polypropylene, polytrimethylene terephthalate, and polyethylene terephthalate. Blends of such natural and synthetic fibers are also contemplated. The fibers are formed in a sheet, typically by hydro-entanglement or needle-entanglement.

The halo active aromatic sulfonamide compound is as described above. The sulfonamide compound is deposited or loaded onto the nonwoven substrate in the desired amount. This can be done by deposition of sulfonamide powder, atomization of a liquid containing the sulfonamide compound onto the nonwoven substrate, or any other desired process.

The fabric dryer sheets of the present disclosure can also be loaded with other agents, such as cationic softening agents, antistatic agents, dispersing agents, or fragrances. These agents are generally released during the drying cycle as a result of the heat within the clothes dryer, and contact with the clothing induced by the tumbling action of the dryer. Examples of cationic softening agents or antistatic agents include alkylated quaternary ammonium compounds, ring or cyclic quaternary ammonium compounds, aromatic quaternary ammonium compounds, diquaternary ammonium compounds, alkylated quaternary ammonium compounds, amidoamine quaternary ammonium compounds, ester quaternary ammonium compounds, and mixtures thereof. Of course, the fabric dryer sheets disclosed herein may also include any combination of two or more of these components.

The compositions of the present disclosure are illustrated by the following non-limiting examples, it being understood that these examples are intended to be illustrative only and that the present application is not intended to be limited to the materials, conditions, process parameters and the like recited herein. All proportions are by weight unless otherwise indicated.

EXAMPLES

Example 1

Polyester workout shirts were worn without deodorant during a one-hour workout to induce copious amounts of sweat. The shirts were kept in sealed plastic bags for several days, mimicking normal wash schedule delay. The shirts were then soaked in buckets containing various amounts of N-chloro-4-carboxybenzenesulfonamide (BENZ). The bucket contained either zero (control), 0.02 wt %, 0.04 wt %, or 0.15 wt % of the BENZ (e.g. 0.02 grams BENZ per 100 grams of water, w/w). No agitation, spinning, or moving of any kind occurred during the soaking. After 30 minutes of soaking, the shirts were wrung out and laid to dry.

The shirts were smelled before soaking (Pre Soak), after the 30 minutes of soaking (Post Wet), and after they were dried (Post Dry) by a group of people who subjectively rated the scent of the shirt on a scale of 0 (no smell) to 10 (extremely smelly).

The average rating for each amount of BENZ at the given time are shown in the table below. The 0.15 wt % concentration eradicated the malodor completely once the shirt was dry. The 0.02 wt % and 0.04 wt % concentrations reduced the intensity of the malodor significantly.

| | Pre Soak | Post Wet | Post Dry | Water |
|---|---|---|---|---|
| Control | 10 | 9 | 8 | 10 |
| 0.02 wt % | 10 | 5 | 5 | 7 |
| 0.04 wt % | 10 | 5 | 4 | 5 |
| 0.15 wt % | 10 | 1 | 0 | 2 |

Example 2

Polyester workout shirts were worn without deodorant during a one-hour workout to induce copious amounts of sweat. The shirts were kept in sealed plastic bags for several days, mimicking normal wash schedule delay. The shirts were then washed in a laundry machine using different laundry soap formulas.

The laundry soap formulas were each a total of 100 grams. The formulas contained N-chloro-4-carboxybenzenesulfonamide (BENZ), a mixture of sodium laureth sulfate (SLES) and linear alkylbenzene sulfonate (LAS) surfactants, and sodium bicarbonate. The laundry soap formulas contained either 5 grams, 2 grams, 1 gram, or 0.5 grams of the BENZ, with the amounts of the other ingredients adjusted accordingly, or in other words 5 wt %, 2 wt %, 1 wt %, or 0.5 wt % BENZ (w/w).

Each soap formulas was tested together with a control (no BENZ). After being dried, the shirts were smelled by a panel of 4 or 6 people who subjectively rated the scent of the shirt on a scale of 0 (no smell) to 10 (extremely smelly). Those results, listed by the amount of BENZ, pre-wash or post-wash, and the panelist number, are listed in the two tables below. It is noted that the 5% BENZ formula was tested first; this may be relevant because the panelists did not have a basis for determining what a 0 score should be.

| | Control Pre-Wash | Control Post-Wash | 5% BENZ Pre-Wash | 5% BENZ Post-Wash |
|---|---|---|---|---|
| Panel 1 | 10 | 4 | 10 | 1 |
| Panel 2 | 10 | 3 | 10 | 1 |
| Panel 3 | 10 | 3 | 10 | 1 |
| Panel 4 | 10 | 4 | 10 | 0 |
| Average | 10 | 3.5 | 10 | 0.75 |

| | Control Pre-Wash | Control Post-Wash | 2% BENZ Pre-Wash | 2% BENZ Post-Wash |
|---|---|---|---|---|
| Panel 1 | 10 | 4 | 10 | 1 |
| Panel 2 | 10 | 3 | 10 | 0 |
| Panel 3 | 10 | 5 | 10 | 0 |
| Panel 4 | 10 | 4 | 10 | 1 |
| Panel 5 | 10 | 5 | 10 | 1 |
| Panel 6 | 10 | 4 | 10 | 2 |
| Average | 10 | 4.2 | 10 | 0.8 |

| | Control Pre-Wash | Control Post-Wash | 1% BENZ Pre-Wash | 1% BENZ Post-Wash |
|---|---|---|---|---|
| Panel 1 | 10 | 4 | 10 | 1 |
| Panel 2 | 10 | 4 | 10 | 0 |
| Panel 3 | 10 | 3 | 10 | 1 |
| Panel 4 | 10 | 4 | 10 | 1 |
| Panel 5 | 10 | 2 | 10 | 0 |
| Panel 6 | 10 | 3 | 10 | 1 |
| Average | 10 | 3.3 | 10 | 0.7 |

| | Control Pre-Wash | Control Post-Wash | 0.5% BENZ Pre-Wash | 0.5% BENZ Post-Wash |
|---|---|---|---|---|
| Panel 1 | 10 | 4 | 10 | 1 |
| Panel 2 | 10 | 5 | 10 | 2 |
| Panel 3 | 10 | 4 | 10 | 2 |
| Panel 4 | 10 | 6 | 10 | 1 |
| Panel 5 | 10 | 5 | 10 | 2 |
| Panel 6 | 10 | 5 | 10 | 2 |
| Average | 10 | 4.8 | 10 | 1.7 |

| SUMMARY | Average Post-Wash | No. Shirts with Score </= 1 | Total Score |
|---|---|---|---|
| 5% BENZ | 0.75 | 4 | 3 |
| 2% BENZ | 0.8 | 5 | 5 |
| 1% BENZ | 0.7 | 6 | 4 |
| 0.5% BENZ | 1.7 | 2 | 10 |

As expected, the 5% BENZ formula performed the best. The 1% and 2% formulas also performed well. It is also noted that these concentrations are for the BENZ in the detergent itself. The effective concentration of BENZ in the wash cycle after water is added is much lower. A wash cycle in a typical washer may include 10 to 20 gallons of water (37.9 to 75.7 liters), so that the resulting concentration of BENZ in the wash cycle might be as low as 0.0005 wt % or 0.0005 g/mL.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An antimicrobial or odor-controlling laundry detergent composition, comprising:

A) a halo active aromatic sulfonamide compound of Formula (I):

Formula (I)

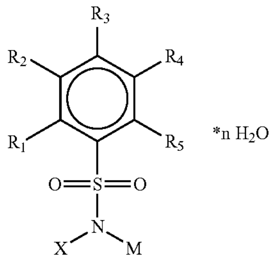

wherein $R_1$, $R_2$, $R_4$, and $R_5$ are independently selected from hydrogen, COOR', CON(R")$_2$, alkoxy, CN, $NO_2$, $SO_3$R", halogen, substituted or unsubstituted phenyl, sulfonamide, halosulfonamide, N(R")$_2$, substituted or unsubstituted $C_1$-$C_{18}$ alkyl, and substituted or unsubstituted aromatic;

$R_3$ is COOR';

R' is hydrogen, an alkali metal, an alkaline earth metal, substituted $C_1$-$C_{18}$ alkyl, or unsubstituted $C_1$-$C_{18}$ alkyl; and R" is hydrogen or substituted or unsubstituted $C_1$-$C_{18}$ alkyl, where the two R" groups in CON(R")$_2$ and N(R")$_2$ may be independently selected;

X is halogen;

M is an alkali or alkaline earth metal; and n is the number of water molecules per molecule of the sulfonamide compound;

B) a polysaccharide deposition aid at least partly substituted with a cationic substituent or with a nonionic substituent; and C) an anionic, nonionic, amphoteric, or zwitterionic surfactant;

wherein the halo active aromatic sulfonamide compound of Formula (I) is present in the laundry detergent composition in an amount of from 0.02 wt % to 0.15 wt %.

2. The laundry detergent composition of claim 1, wherein the halo active aromatic sulfonamide compound is N-chloro-4-carboxybenzenesulfonamide.

3. The laundry detergent composition of claim 1, further comprising at least one enzyme.

4. The laundry detergent composition of claim 1, wherein the at least one surfactant is present in the laundry detergent composition in an amount of about 0.1 wt % to about 70 wt %.

5. The laundry detergent composition of claim 3, wherein the at least one enzyme is present in the laundry detergent composition in an amount of about 0.1 wt % to about 70 wt %.

6. The laundry detergent composition of claim 1, further comprising a liquid carrier.

7. The laundry detergent composition of claim 1, wherein the laundry detergent composition has a pH of about 6 to about 14.

8. The laundry detergent composition of claim 1, further comprising a detergency builder.

9. The laundry detergent composition of claim 8, wherein the detergency builder is present in the laundry detergent composition in an amount of about 0.1 wt % to about 70 wt %.

10. The laundry detergent composition of claim 1, further comprising an anti-redeposition agent.

11. The laundry detergent composition of claim 10, wherein the anti-deposition agent is present in the laundry detergent composition in an amount of about 0.01 wt % to about 50 wt %.

12. The laundry detergent composition of claim 1, wherein the deposition aid is present in the laundry detergent composition in an amount of about 0.1 wt % to about 70 wt %.

13. The laundry detergent composition of claim 1, further comprising one or more additional ingredients selected from the group consisting of: a bleach; a bleach system; sodium carbonate; sodium silicate; sodium sulphate; a foam controller; a foam booster; a fragrance; a fabric conditioner; a soil release polymer; a dye transfer inhibitor; a photobleach; a fluorescer; a pearlizer; and a colorant.

14. The laundry detergent composition of claim 13, wherein the one or more additional ingredients are present in the laundry detergent composition in an amount of about 0.01 wt % to about 70 wt %.

15. A fabric dryer sheet, comprising:

a halo active aromatic sulfonamide compound of Formula (I):

Formula (I)

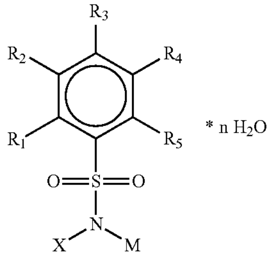

wherein $R_1$, $R_2$, $R_4$, and $R_5$ are independently selected from hydrogen, COOR', $CON(R'')_2$, alkoxy, CN, $NO_2$, $SO_3R''$, halogen, substituted or unsubstituted phenyl, sulfonamide, halosulfonamide, $N(R'')_2$, substituted or unsubstituted $C_1$-$C_{18}$ alkyl, and substituted or unsubstituted aromatic;

$R_3$ is COOR';

R' is hydrogen, and alkali metal, an alkaline earth metal, substituted $C_1$-$C_{18}$ alkyl, or unsubstituted $C_1$-$C_{18}$ alkyl; and R" is hydrogen or substituted or unsubstituted $C_1$-$C_{18}$ alkyl, where the two R" groups in $CON(R'')_2$ and $N(R'')_2$ may be independently selected;

X is halogen;

M is an alkali or alkaline earth metal; and n is the number of water molecules per molecule of the sulfonamide compound;

a softening agent an antistatic agent; and a dry cationic nonwoven substrate.

16. A method for removing odor from laundry, comprising adding to a washing machine an antimicrobial or odor-controlling laundry detergent composition, comprising a halo active aromatic sulfonamide compound of Formula (I):

Formula (I)

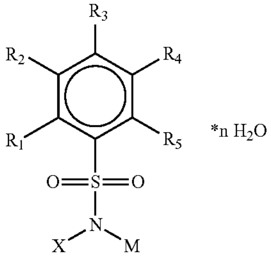

wherein $R_1$, $R_2$, $R_4$, and $R_5$ are independently selected from hydrogen, COOR', $CON(R'')_2$, alkoxy, CN, $NO_2$, SOBR", halogen, substituted or unsubstituted phenyl, sulfonamide, halosulfonamide, $N(R'')_2$, substituted or unsubstituted $C_1$-$C_{18}$ alkyl, and substituted or unsubstituted aromatic;

$R_3$ is COOR';

R' is hydrogen, an alkali metal, an alkaline earth metal, substituted $C_1$-$C_{18}$ alkyl, or unsubstituted $C_1$-$C_{18}$ alkyl; and R" is hydrogen or substituted or unsubstituted $C_1$-$C_{18}$ alkyl, where the two R" groups in $CON(R'')_2$ and $N(R'')_2$ may be independently selected;

X is halogen;

M is an alkali or alkaline earth metal; and n is the number of water molecules per molecule of the sulfonamide compound;

wherein a concentration of the sulfonamide compound during a wash cycle is from 0.02 wt % to 0.15 wt %.

* * * * *